United States Patent [19]

Selleri

[11] 4,375,256

[45] Mar. 1, 1983

[54] MACHINE FOR SORTING WORKPIECES BELONGING TO DIFFERENT CLASSIFICATION CLASSES

[75] Inventor: Narciso Selleri, Monteveglio, Italy

[73] Assignee: Finike Italiana Marposs, S.p.A., S. Marino di Bentivoglio, Italy

[21] Appl. No.: 288,046

[22] Filed: Jul. 29, 1981

Related U.S. Application Data

[63] Continuation of Ser. No. 26,751, Apr. 3, 1979, abandoned.

[30] Foreign Application Priority Data

Apr. 17, 1978 [IT]   Italy .................................. 3393 A/78

[51] Int. Cl.³ ........................ B65G 37/00; B65G 47/10
[52] U.S. Cl. ..................................... 198/360; 198/370; 414/134
[58] Field of Search ............... 198/370, 360, 349, 365, 198/366; 209/912, 566; 414/134, 135, 136

[56] References Cited

U.S. PATENT DOCUMENTS 2,742,133  4/1956  Winn .................................... 198/360
4,258,850  3/1981  Solaroli .............................. 198/360

*Primary Examiner*—Andres Kashnikow
*Assistant Examiner*—Brian Bond
*Attorney, Agent, or Firm*—Stevens, Davis, Miller & Mosher

[57] ABSTRACT

A machine for sorting workpieces belonging to different classification classes, including a frame, a loading device, a plurality of outputs for the different classification classes, conveyor apparatus to direct the workpieces to the relevant outputs and control apparatus adapted to receive signals responsive to the classes of workpieces in order to actuate the conveyor apparatus, said conveyor apparatus including a first slide moving from a position for loading the workpiece to be sorted to a position adjacent to an output corresponding to the class of the workpieces, said slide including workpiece stops adapted to allow the unloading of the workpiece onto a relevant output after its positioning in the position adjacent to the output, the control apparatus being adapted to realize the positioning of the slide in the loading and unloading positions.

9 Claims, 4 Drawing Figures

MACHINE FOR SORTING WORKPIECES BELONGING TO DIFFERENT CLASSIFICATION CLASSES

This is a continuation of application Ser. No. 26,751, filed Apr. 3, 1979, now abandoned.

The present invention relates to a machine for sorting workpieces belonging to different classification classes, with a frame, a loading device, a plurality of outputs for the different classification classes, conveyor means to direct the workpieces to the relevant outputs and control means adapted to receive signals responsive to the classes of the workpieces in order to actuate the conveyor means.

More particularly the machine relates to the sorting of automobile connecting rods.

Apparatuses are already known which sort mechanical workpieces—previously checked and classified by gauging machines or other checking devices—and which direct the workpieces belonging to the different classes to relevant outputs. The workpieces, which are transported by conveyor means, or slide down chutes, are directed to the outputs by switches or pawls selectively actuated depending on the classification classes previously detected.

The known apparatuses are very complex from a mechanical and also electrical point of view, especially when there are many classification classes.

It is clear that if the number of classification classes is, for example, 30, it will be necessary to use just as many switches or similar devices and consequently the mechanical and electrical structures become very complicated and cumbersome; thus the risk of faults and the manufacturing waste are excessive.

An object of the invention is to provide a machine capable of sorting workpieces according to even a high number of classification classes that is relatively simple, reliable and inexpensive.

This and other objects and advantages will become evident through the following description regarding a machine for sorting workpieces belonging to different classification classes, with a frame, a loading device, a plurality of outputs for the different classification classes, conveyor means to direct the workpieces to the relevant outputs and control means adapted to receive signals responsive to the classes of the workpieces in order to actuate the conveyor means. The conveyor means include a slide moving from a position for loading the workpiece to be sorted to a position adjacent to an output corresponding to the class of the workpiece. The slide includes workpiece stopping means adapted to allow the unloading of the workpiece onto a relevant output after its positioning in the position adjacent to the output. The control means is adapted to realize the positioning of the slide in the loading and unloading positions.

The invention is now described in more detail according to a preferred embodiment illustrated in the accompanying drawings given by way of non-limiting example in which.

Figure 1:
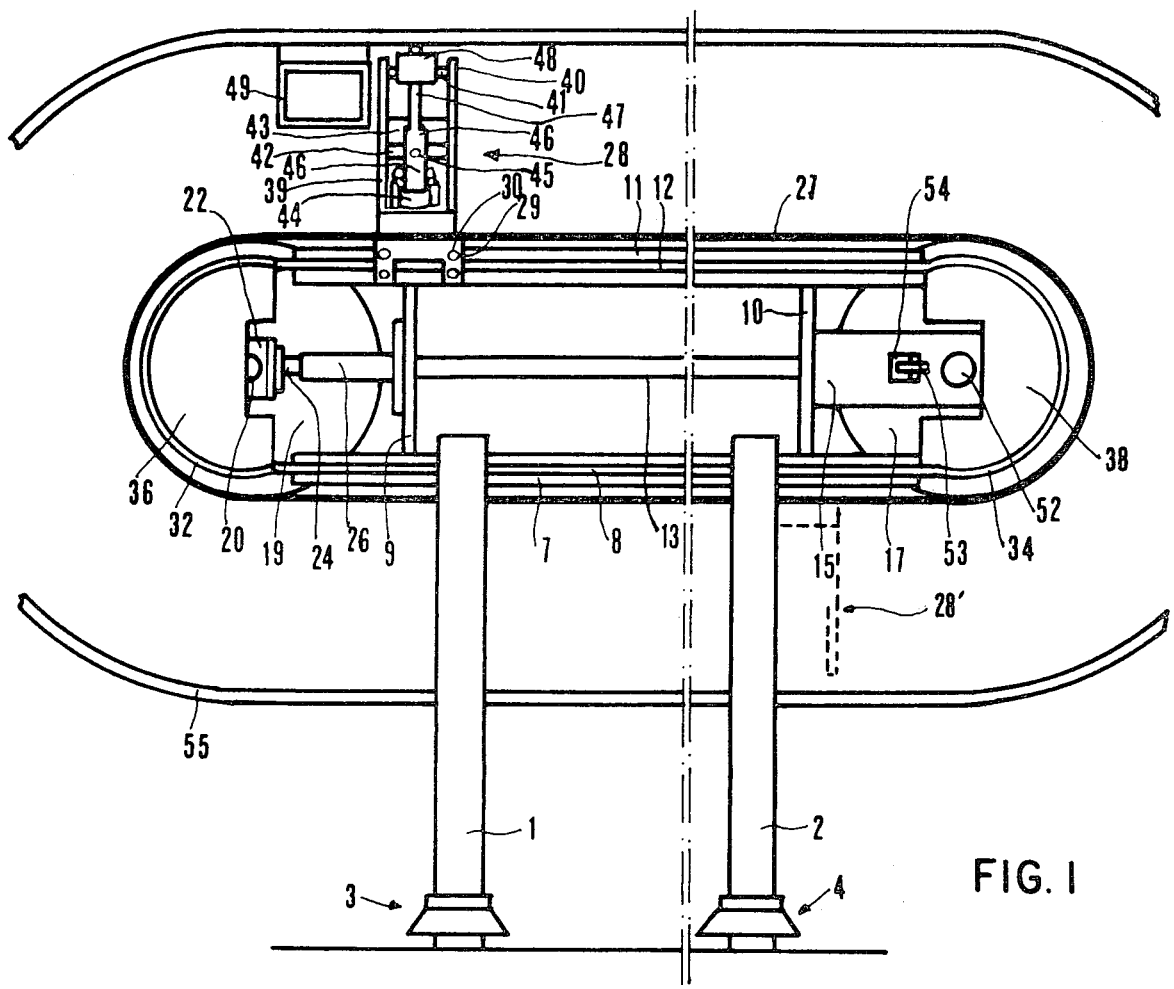
FIG. 1 is a vertical simplified elevation view of a machine for sorting connecting rods.
Figure 2:
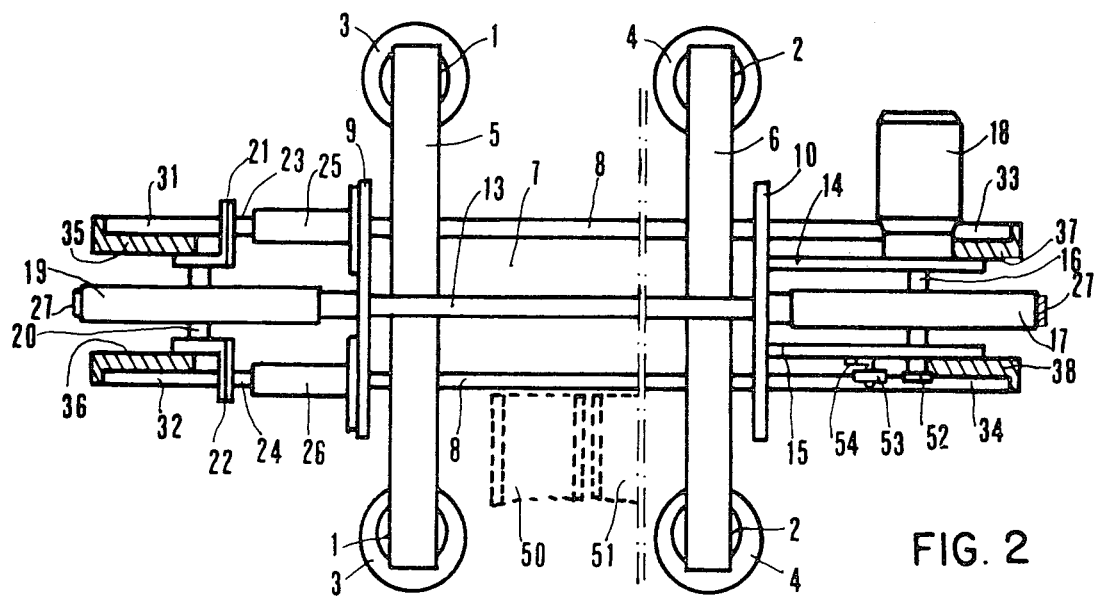
FIG. 2 is a simplified plan cross-sectional view of the machine shown in FIG. 1.

With reference to FIGS. 1 to 4, the machine for sorting connecting rods includes a frame supported by pairs of stanchions, two of which 1 and 2 can be seen in the figures. The stanchions are supported by bases 3 and 4. The frame includes cross members 5 and 6 clamped to stanchions 1 and 2. The cross members 5 and 6 support a lower longitudinal plate 7 having laterally two rails 8.

Two vertical plates 9 and 10 welded to plate 7 in turn support an upper longitudinal plate 11 having laterally two rails 12. Plates 9 and 10 are connected by a stiffening longitudinal member 13.

Two other vertical plates 14 and 15 welded to plate 10 in symmetrical positions with respect to the axis of stiffening longitudinal member 13 support the axle 16 of a toothed driving pulley 17 activated by a motor 18 clamped to plate 14.

A toothed transmission pulley 19 has its axle 20 supported by angle plates 21 and 22 supported by plate 9 by means of rods 23 and 24 axially adjustable by means of bushings 25 and 26 integral to plate 9.

A cog belt 27 which is mounted on pulleys 17 and 19 is tensioned by adjusting the position of rods 23 and 24 in bushings 25 and 26.

A slide 28 is clamped to belt 27. The slide has a guide base 29 provided with idle rollers 30 rotating on rails 8 and 12 and on other rails 31, 32, 33 and 34.

Rails 31 and 32 are formed in plates 35 and 36 which are welded to angle plates 21 and 22, respectively. Rails 33 and 34 are formed in plates 37 and 38 which are welded to plates 14 and 15, respectively.

Rails 8, 12, 31, 32, 33 and 34 form two endless guides that are substantially parallel to belt 27, for guiding the base 29 with rollers 30 of slide 28.

Slide 28 has two lateral vertical walls 39 and 40 (FIG. 1), two stiffening cross-members 41 and 42 and a chute 43 which forms a support for gravitationally sliding connecting rods 44.

Cross-member 42 has a horizontal pin 45 which is coupled at its front end with a closure device for the front opening of the slide. The closure device includes a stop arm 46, a rod 47 and a counterweight 48. Above pulley 19 there is a loading station of the connecting rods 44 on slide 28. The loading station includes a chute 49 which ends at a height corresponding to the input of chute 43 of slide 28.

Laterally with respect to one of the rails 8 and beside the upper intermediate section of belt 27 there are arranged, one beside the other, outlet unloading chutes of connecting rods 44. The outlet chutes, two of which, 50 and 51 are schematically shown with dashed lines in FIG. 2, have the sliding surface lying in the same plane as chute 43 of slide 28. The unloading chutes are located, with respect to belt 27, at the side opposite the loading chute 49. The loading and unloading chutes 49, 50 and 51 and chute 43 allow connecting rods 44 to gravitationally slide in directions parallel to one another and perpendicular to the axis of belt 27. The length of belt 27 is, of course, such as to allow the arrangement of a number of outlet chutes equal to the number of classification classes of connecting rods 44.

Axle 16 of the toothed driving pulley 17 has a small wheel 52 peripherally graduated with suitable markings, An electro-optic sensor 53, supported by a bracket 54, which is clamped to plate 15, is placed opposite the rim of wheel 52.

Stanchions 1 and 2 also support a protection shell 55.

Figure 3:
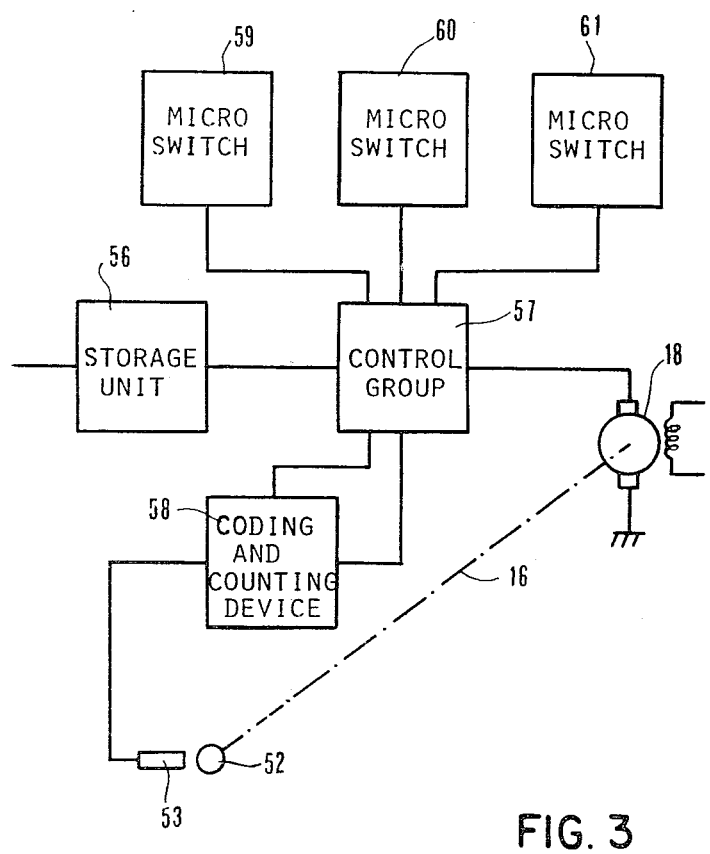
FIG. 3 is a diagram of the actuation devices of the sorting machine.
Figure 4:
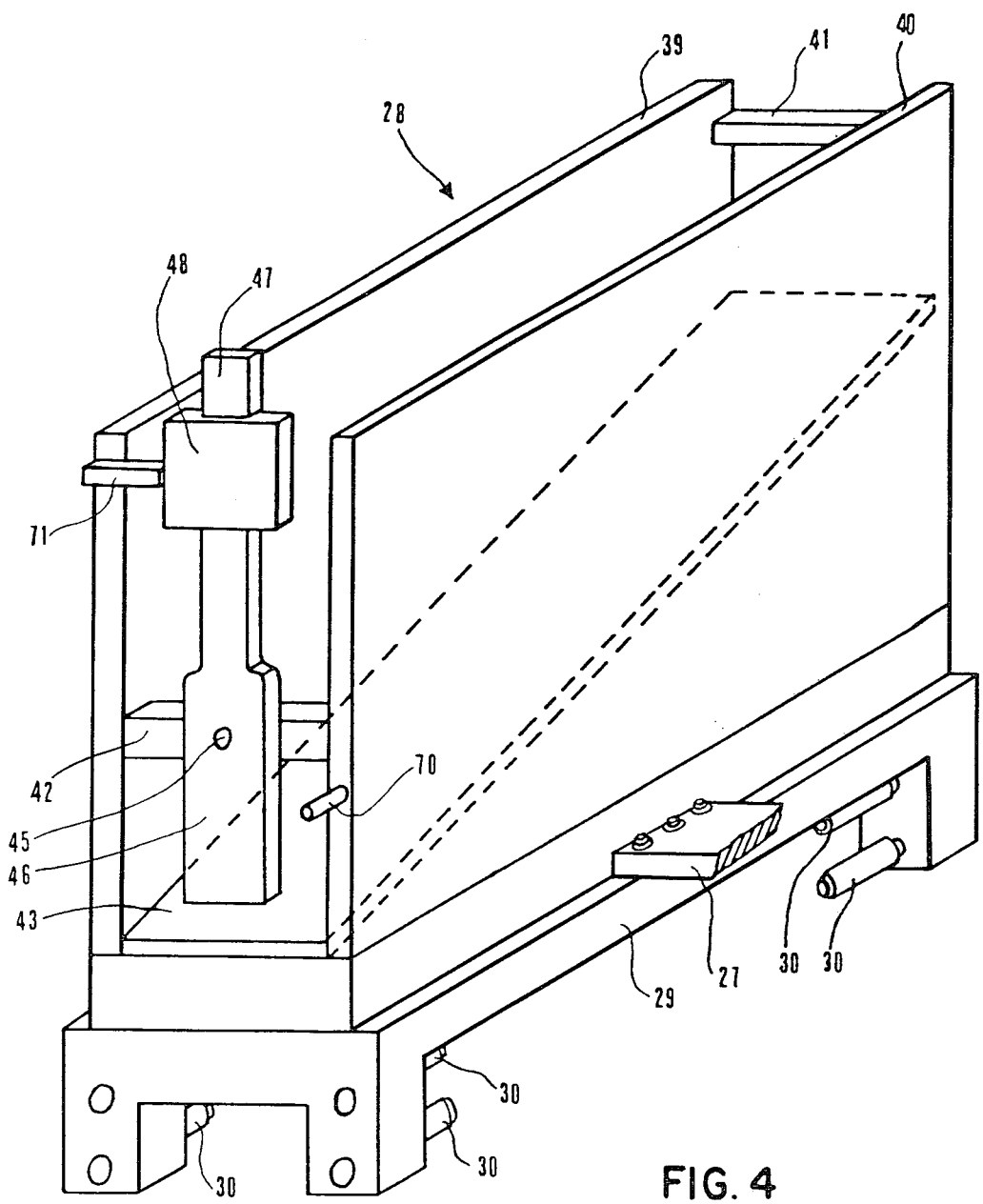
FIG. 4 is a perspective view of a slide of the machine of FIGS. 1-3.

With particular reference to FIG. 3, there is a storage unit 56 receiving in succession, from a gauging machine, not shown, or from other devices that check connecting rods 44, signals indicating the class of the connecting rod to be sorted, i.e., to be directed to a relevant one of outlets 50, 51.

Unit 56 transmits an output signal to a control group 57 of motor 18. The signal received from the control group 57 is suitably amplified for the actuation of motor 18; moreover the signal is coded in order to indicate, with a suitable code, the amount of rotation of the rotor of motor 18 required to bring slide 28 from its position in front of the loading chute 49 to the one corresponding to the desired outlet 50, 51. The signal coded in this way is compared in group 57 with a signal indicating the actual position of slide 28. This latter signal is obtained by means of sensor 53 and of a coding and counting device 58. A signal resulting from the comparison of the two coded signals commands motor 18 to stop when slide 28 reaches its desired position.

A microswitch 59 mounted on the frame of the machine at the loading station is actuated by slide 28 when the latter reaches its loading position and it controls, by means of group 57, motor 18 to stop in order to allow the loading of the connecting rod to be sorted 44. The signal of the microswitch also controls, by means of group 57 the zerosetting of the coding and counting device 58.

On the outlet chutes 50, 51 there are located relevant microswitches, one of which shown in FIG. 3 with reference number 60, which are actuated when the connecting rods 54 pass in order to indicate that the sorting of a connecting rod 44 has regularly occurred and that it is possible to bring the machine to the position for loading the following connecting rod.

Another microswitch 61 is located at the loading station in order to indicate that a connecting rod has been loaded onto slide 28.

Now follows a description of the machine operation.

It is assumed that slide 28 is located in the loading position and that the stop arm 46 is in a vertical position. Connecting rod 44 to be loaded slides down chute 49 and consequently onto chute 43 of slide 28 and is stopped by arm 46.

Microswitch 61 sends to group 57 an enabling signal for the actuation of motor 18. Unit 56, which had previously received a signal indicating the class of connecting rod 44, provides to group 57 a signal for the actuation of motor 18. Pulley 17 starts to rotate in a clockwise direction and slide 28 horizontally moves from left to right, driven by belt 27 and guided by rails 12. When a comparison circuit of group 57 detects, as previously mentioned, that slide 28 has reached the required unloading position, group 57 controls motor 18 to stop immediately.

Owing to the sudden stopping of slide 28, counterweight 48 causes, due to inertia, stop arm 46 to rotate 90° against a stop 70 and place itself horizontally.

Connecting rod 44 is no longer stopped, and it can therefore slide down chute 43 of slide 28 and consequently, by continuing its travel along the same sliding axis, it slides down the corresponding outlet chute.

The unloading of connecting rod 44 is detected by microswitch 60 (for example) and this causes a new activation of motor 18 that will cause belt 27 and slide 28 to start again.

The slide moves guided by rails 12 and then by rails 33 and 34, passing on the driving pulley 17 and continuing its travel in a horizontal direction from right to left guided by rails 8. Counterweight 48 brings stop arm 46 back to its vertical position.

Slide 28 continues its stroke on the transmission pulley 19, guided by rails 31 and 32. In this phase arm 46 does not move with respect to slide 28, because it is contacted by a stop 71.

Lastly slide 28 reaches its loading position where it stops thanks to the signal provided by microswitch 59, which also causes the zero setting of the coding and counting device 58. Now the machine is ready to start a new sorting cycle.

The machine is suitable for sorting a high number of classes, for example 30 classes, and it can carry out, with this number of classes, up to 800 sortings per hour.

The cycle duration can be shortened, in order to allow an increase in the number of sortings per hour up to approximately 1200, by employing a second slide 28' (partially shown in FIG. 1 with a dashed line), clamped to belt 27 in a symmetric position with respect to slide 28. In this way after the unloading of a connecting rod 44 from slide 28 (28') it is slide 28' (28) that is brought to the loading position.

In view of this the average return time of the slide to the loading position is almost halved.

If the minimum length required for the belt is such that endless belts available on the market cannot be used, it will be convenient to utilize ribbon belts the ends of which are clamped by appropriate jaws of the slide. In this case, in order to allow the slide to pass on pulleys 17 and 19, a slot (or two) suitable for housing the lower part of the slide or slides is obtained in each pulley. The length of belt 27, the profile of the teeth and the diameter of the pulleys are then designed in such a way that slide 28 (28') always be located, when arriving on pulleys 17 and 19, in correspondence with the associated slots. The lower part of the slide and the slots of the pulleys can be shaped in order to ensure the transmission of the driving forces from the pulleys to the slide and to the belt.

If the number of the classification classes is relatively small, the machine can be modified so that the slide reciprocates, instead of moving always in the same direction along a closed loop.

Special advantages of the machine are its simplicity, its easy retooling in the event that the number of classification classes needs to be changed, the possibility of sorting connecting rods of different types, and small overall dimensions.

The machine can be completed by other safety and enabling devices in order to render even more reliable its functioning. For example, it can employ a friction adjustable system, or one of another type, that opposes itself to the rotation of stop arm 46 in order to avoid any possible small decelerations of slide 28, vibrations or other kinds of inconveniences to cause stop arm 46 to open before slide 28 stops in its unloading position.

As a further safety factor it is possible to use other devices for releasing connecting rod 44 on slide 28 when the slide has reached its unloading position.

Obviously the aforedescribed machine can undergo other variants and changes equivalent from a functional and structural point of view without falling outside the scope of the present invention. It is also evident that the application of the invention is not limited to the sorting of connecting rods, but it can also apply to the sorting of workpieces of other type.

What is claimed is:

1. A machine for sorting pieces belonging to different classification classes, comprising:

a frame;

a conveyor supported by the frame, the conveyor including supporting and driving means and a slide fixedly coupled to the supporting and driving means, the supporting and driving means being displaceable for driving the slide along a path including an upper horizontal portion from a loading portion to selectable unloading positions, the slide including a chute having an open input and an output front opening aligned with each other and forming a support for gravitationally sliding the pieces from the open input to the output front opening, and movable stop means for closing said output front opening to stop the piece located in the chute;

a loading chute for receiving in succession the pieces to be sorted for gravitationally sliding the same onto the slide chute, the loading chute being arranged above the supporting and driving means and ending at a height adapted to substantially correspond with the open input of the slide chute;

a plurality of unloading chutes, each corresponding to a relevant classification class of the pieces, the unloading chutes being arranged laterally with respect to said supporting and driving means, at a side opposite the loading chute, the unloading chutes having sliding surfaces for gravitationally sliding the pieces, the sliding surfaces being arranged to receive pieces sliding out of the slide chute and to permit unloading of the same; and control means for controlling the supporting and driving means, the control means including a motor for actuating the supporting and driving means; a unit for receiving signals responsive to the classification class of the piece to be sorted; a control group connected to said unit and to the motor, the control group being adapted to control the motor for starting the supporting and driving means from the loading position of the slide chute, for subsequently stopping the supporting and driving means to locate the slide chute at the unloading chute corresponding to the classification class of the piece to be sorted and for thereafter starting again the supporting and driving means for displacing the slide to the loading position, and wherein said movable stop means are adapted to open said front opening after stopping of the slide chute at said unloading chute, for permitting the piece to slide down from the slide chute to the relevant unloading chute.

2. A machine for sorting pieces belonging to different classification classes comprising:

a frame;

a conveyor supported by the frame, the conveyor including supporting and driving means and a slide fixedly coupled to the supporting and driving means, the supporting and driving means being displaceable for driving the slide along a path including an upper horizontal portion from a loading position to selectable unloading positions, the slide including a chute having an open input and an output front opening aligned with each other and forming a support for gravitationally sliding the pieces from the open input to the output front opening, and movable stop means for closing said output front opening to stop the piece located in the chute, the stop means including a couterweight adapted to respond to sudden stopping of the slide for displacing due to inertia, the stop means to an open condition;

a loading chute for receiving in succession the pieces to be sorted for gravitationally sliding the same onto the slide chute, the loading chute being arranged above the supporting and driving means and ending at a height adapted to correspond substantially with the open input of the slide chute;

a plurality of unloading chutes, each corresponding to a relevant classification class of the pieces, the unloading chutes being arranged laterally with respect to said supporting and driving means, at a side opposite the loading chute, the unloading chutes defining sliding surfaces adapted to lie in the same plane as the slide chute, said sliding surfaces being arranged to receive pieces sliding out of the slide chute and gravitationally slide the pieces; and control means for controlling the supporting and driving means, the control means including a motor for actuating the supporting and driving means, a unit for receiving signals responsive to the classification class of the piece to be sorted; a control group connected to said unit and to the motor for starting the supporting and driving means from the loading position of the slide chute, for subsequently suddenly stopping the supporting and driving means to locate the slide chute adjacent to the unloading chute corresponding to the classification class of the piece to be sorted, and for thereafter starting again the supporting and driving means for displacing the slide to the loading position, and wherein said couterweight displaces the stop means to said open condition due to the suddenly stopping of the slide adjacent to said unloading chute and closes again the stop means when the slide is displaced again to the loading position.

3. The machine according to claim 2, wherein said stop means comprise a horizontal pin and a closure member including a stop arm and said couterweight, the closure member being coupled to the pin and being pivotable.

4. A machine for sorting pieces belonging to different classification classes, comprising:

a frame;

an endless conveyor including a driving pulley, a transmission pulley, a belt coupled to the pulleys and a slide fixedly coupled to the belt, the slide including: a chute having an open input and an output front opening aligned with each other, the chute forming a support for gravitationally sliding the pieces from the open input to the output front opening; and stop means movable from a position for closing said front opening to stop the piece located in the chute, to an open position permitting the piece to slide out of the chute;

a loading chute for receiving a succession the pieces to be sorted for gravitationally sliding them onto the slide chute, the loading chute being arranged above an upper horizontal displacement path defined by the belt, the loading chute ending at a height adapted to correspond substantially with the open input of the slide chute;

a plurality of unloading chutes, each corresponding to a relevant classification class of the pieces, the unloading chutes being arranged laterally with respect to the belt, at a side opposite the loading chute, the unloading chutes defining sliding surfaces adapted to lie in a same plane as the slide chute, said sliding surfaces being arranged to receive pieces sliding out of the slide chute and to gravitationally slide them; and control means including a motor for actuating the driving pulley, a storage unti for subsequently receiving and storing an external signal responsive to the classification class of the relevant piece to be sorted; a control group connected to said unit and to the motor for commanding the motor; sensor means for providing a signal responsive to the actual position of the slide; comparator means coupled to the sensor means and to the control group for comparing said signal responsive to the actual position of the slide with a signal indicative of the desired position for unloading the piece to be sorted, said signal indicative of the desired position being obtained from said signal responsive to the classification class; wherein the control group is adapted to command the motor to stop the driving pulley when the slide is located at said position adjacent the loading chute, to thereafter rotate the driving pulley for displacing the slide horizontally to said desired position and for stopping the slide in said desired position, and to restart the driving pulley, after movement of the stop means to the open position and sliding of the piece out of the slide chute, to displace the slide towards and stop it at said position adjacent the loading chute.

5. The machine according to claim 4, wherein said endless conveyor further includes endless rails fixed to the frame, said slide comprising rollers for sliding on said rails.

6. The sorting machine according to claim 4, wherein said control means include first circuit means adapted to detect the arrival of the slide at said position adjacent the loading chute, second circuit means adapted to detect that the piece has slid onto the slide and third circuit means adapted to detect that the piece has slid onto the relevant unloading chute.

7. The sorting machine according to claim 6 or claim 4, wherein said endless conveyor includes a second slide, the slides being brought one after the other to the position adjacent the loading chute and to the relevant desired position.

8. A machine for sorting connecting rods belongings to different classification classes, comprising:

a frame;

an endless conveyor including a toothed driving pulley, a transmission pulley, a cog belt mounted on the pulleys, a slide fixedly coupled to the cog belt and guide means coupled to the frame for guiding the slide along two horizontal paths comprised between the pulleys and wherein the slide includes:

a chute having an open input and an output front opening aligned with each other, the chute forming a support for gravitationally sliding the connecting rods along a sliding direction from the open input to the output front opening; movable stop means for closing said output front opening, the stop means including a pivotable stop member with a couterweight adapted to respond to sudden stopping of the slide to rotate the stop member and open said output front opening; and rollers for cooperating with said guide means;

a loading chute for receiving in succession the connecting rods to be sorted, for gravitationally sliding them onto the slide chute along a sliding direction parallel to that of the slide chute, the loading chute being arranged above the cog belt at a height adapted to substantially correspond with the input of the slide chute;

a plurality of outlet chutes, each corresponding to a relevant classification class of the connecting rods, the outlet chutes being arranged laterally to the cog belt, at a side opposite the loading chute, the outlet chutes including sliding surfaces for gravitationally sliding the connecting rods, the sliding surfaces being adapted to lie in a same plane as the slide chute, and to define sliding directions parallel to one another and to the sliding directions of the loading chute and the slide chute; and control means including a motor for rotating the driving pulley in preset direction, a storage unit for subsequently receiving and storing a signal responsive to the classification class of the connecting rod to be sorted; a control group connected to said unit and to the motor for commanding the motor; sensing means for providing a signal responsive to the actual position of the slide; comparator means coupled to the sensor means and to the control group for comparing the actual position of the slide with a signal depending on said signal responsive to the classification class, wherein the control group is adapted to command the motor to rotate the driving pulley for horizontally displacing the slide from a stop loading position adjacent to the loading chute to an unloading position adjacent to the outlet chute corresponding to the classification class of the connecting rod loaded at the loading position, the control group being moreover adapted to suddenly stop the motor at said unloading position for causing the stop member to rotate for allowing unloading of the connecting rod and to restart the motor for returning the slide to said loading position after travel over a first one of the pulleys, along one of said horizontal paths, and over the other pulley, wherein the couterweight causes the stop member to rotate to close said output front opening when the slide travels over the first pulley.

9. The sorting machine according to claim 8, wherein said guide means includes rails coupled to the frame, said rails being substantially parallel to the cog belt.

* * * * *

UNITED STATES PATENT AND TRADEMARK OFFICE
CERTIFICATE OF CORRECTION

PATENT NO. : 4,375,256
DATED : March 1, 1983
INVENTOR(S) : Narciso SELLERI

It is certified that error appears in the above—identified patent and that said Letters Patent is hereby corrected as shown below:

Claim 4, line 58 of column 6, change "a" to --in--.
Claim 4, line 7 of column 7, change "unti" to --unit--.
Claim 6 (allowed claim 13) should be claim 5.
Claim 5 (allowed claim 21) should be claim 6 and should depend from claim 4 or claim 5.
Claim 7 should depend from claim 5 or claim 4.

Signed and Sealed this

Fifth Day of July 1983

[SEAL]

Attest:

Attesting Officer

GERALD J. MOSSINGHOFF
Commissioner of Patents and Trademarks